US010244587B2

(12) United States Patent
Werner et al.

(10) Patent No.: US 10,244,587 B2
(45) Date of Patent: Mar. 26, 2019

(54) FOIL BAG, CARBON CONTAINING NIPPLE, NIPPLE KIT, CARBON CONTAINING ELECTRODE, ELECTRODE KIT, ELECTRODE-NIPPLE SYSTEM, FURNACE AND METHOD OF OPERATING THE FURNACE

(71) Applicant: SHOWA DENKO CARBON Germany GmbH, Meitingen (DE)

(72) Inventors: Franz-Xaver Werner, Meitingen (DE); Martin Christ, Meitingen (DE); Stefan Fischer, Meitingen (DE); Norbert Richter, Meitingen (DE)

(73) Assignee: SHOWA DENKO CARBON Germany GmbH, Meitingen (DE)

( * ) Notice: Subject to any disclaimer, the term of this patent is extended or adjusted under 35 U.S.C. 154(b) by 271 days.

(21) Appl. No.: 15/049,748

(22) Filed: Feb. 22, 2016

(65) Prior Publication Data
US 2016/0174303 A1    Jun. 16, 2016

Related U.S. Application Data

(63) Continuation of application No. PCT/EP2014/067273, filed on Aug. 12, 2014.

(30) Foreign Application Priority Data

Aug. 20, 2013  (DE) .......................... 10 2013 216 452

(51) Int. Cl.
| *H05B 7/14* | (2006.01) |
| *H05B 7/08* | (2006.01) |
| *B65D 6/10* | (2006.01) |
| *B65D 33/00* | (2006.01) |

(Continued)

(52) U.S. Cl.
CPC ............... *H05B 7/14* (2013.01); *B65D 11/16* (2013.01); *B65D 17/404* (2018.01);
(Continued)

(58) Field of Classification Search
CPC ............ H05B 7/06; H05B 7/07; H05B 7/085; H05B 7/102; H05B 7/12; H05B 7/14;
(Continued)

(56) References Cited

U.S. PATENT DOCUMENTS

| 2,735,705 A | 2/1956 | Johnson et al. |
| 2,836,806 A | 5/1958 | Stroup |

(Continued)

FOREIGN PATENT DOCUMENTS

ES            224374 A1    1/1956

*Primary Examiner* — Hung D Nguyen
(74) *Attorney, Agent, or Firm* — Laurence A. Greenberg; Werner H. Stemer; Ralph E. Locher

(57) ABSTRACT

A carbon-containing nipple has a nipple thread for carbon-containing electrodes. The nipple has an inlet formed in the nipple thread and the inlet is suitable for receiving an adhesive container filled with a curable adhesive. Preferably, the inlet is a groove which runs through the nipple thread in a transverse manner and is undercut at least in sections. A nipple kit contains such a nipple and the adhesive container containing the adhesive for securing a nipple/electrode connection, wherein the adhesive container is disposed in the inlet. The nipple kit can be used in conjunction with a carbon-containing electrode for use in arc furnaces.

12 Claims, 11 Drawing Sheets

(51) Int. Cl.
  *B65D 35/02* (2006.01)
  *B65D 85/00* (2006.01)
  *H05B 7/102* (2006.01)
  *B65D 17/28* (2006.01)

(52) U.S. Cl.
  CPC .......... *B65D 33/008* (2013.01); *B65D 35/02* (2013.01); *B65D 85/70* (2013.01); *H05B 7/102* (2013.01); *Y02P 10/256* (2015.11); *Y02P 10/259* (2015.11)

(58) Field of Classification Search
  CPC ...... B65D 85/70; B65D 11/16; B65D 17/404; B65D 35/02; B65D 33/008; Y02P 10/256; Y02P 10/259
  USPC .......... 373/88, 89, 90–95; 403/28, 267, 296, 403/DIG. 5; 313/332, 354; 264/262
  See application file for complete search history.

(56) References Cited

U.S. PATENT DOCUMENTS

| | | | | |
|---|---|---|---|---|
| 2,941,828 | A | * | 6/1960 | Hund ...................... F16B 7/182 373/92 |
| 3,140,967 | A | * | 7/1964 | Kaufmann et al. ... F16B 39/225 403/267 |
| 3,419,296 | A | * | 12/1968 | Cook ....................... H05B 7/14 373/92 |
| 4,725,161 | A | * | 2/1988 | Dagata .................... H05B 7/14 373/92 |
| 2003/0031763 | A1 | * | 2/2003 | Inagaki ................ B65D 77/225 426/107 |
| 2005/0271114 | A1 | | 12/2005 | Segger et al. |
| 2006/0233467 | A1 | * | 10/2006 | Mize, Jr. ................. B65D 31/00 383/37 |

* cited by examiner

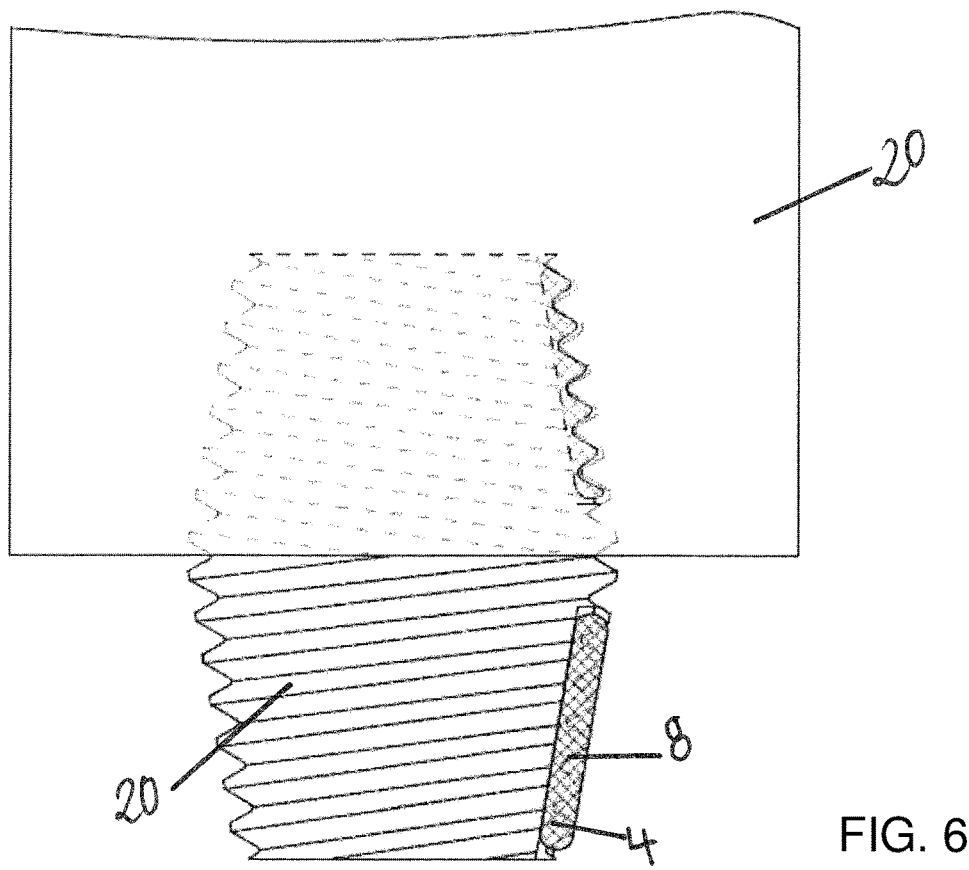
FIG. 6
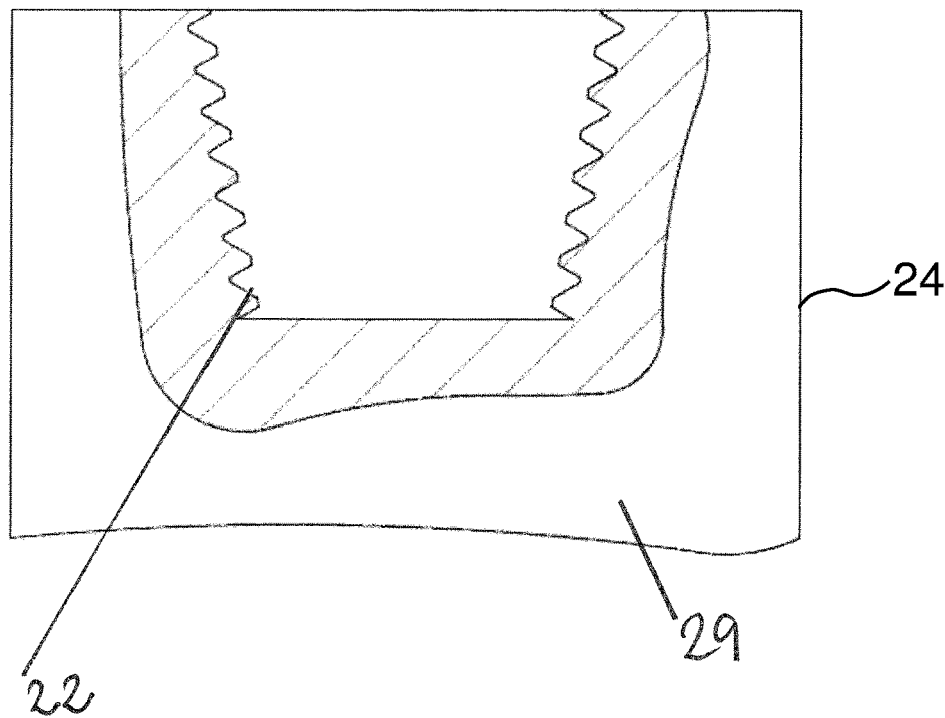

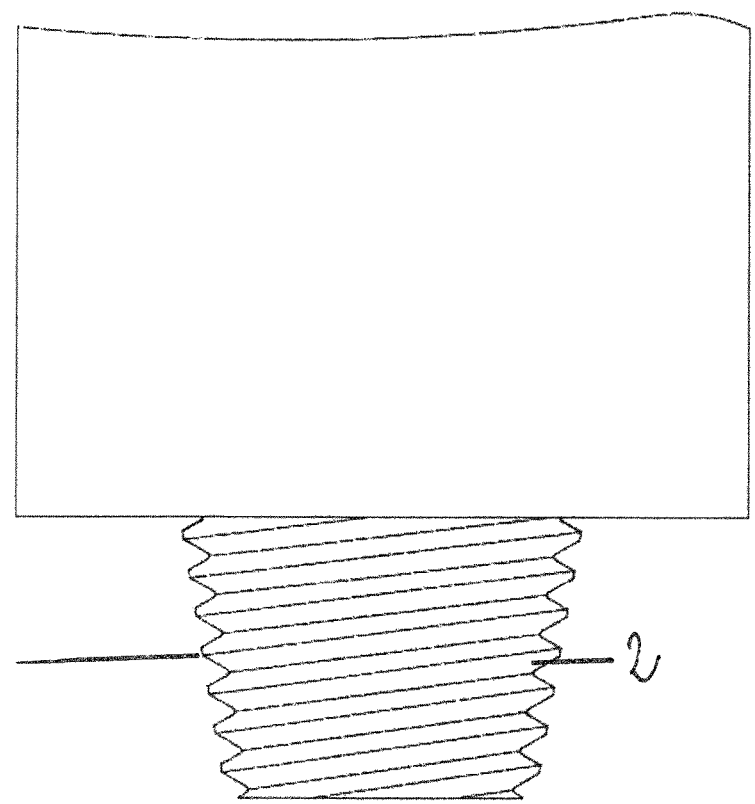
FIG. 9
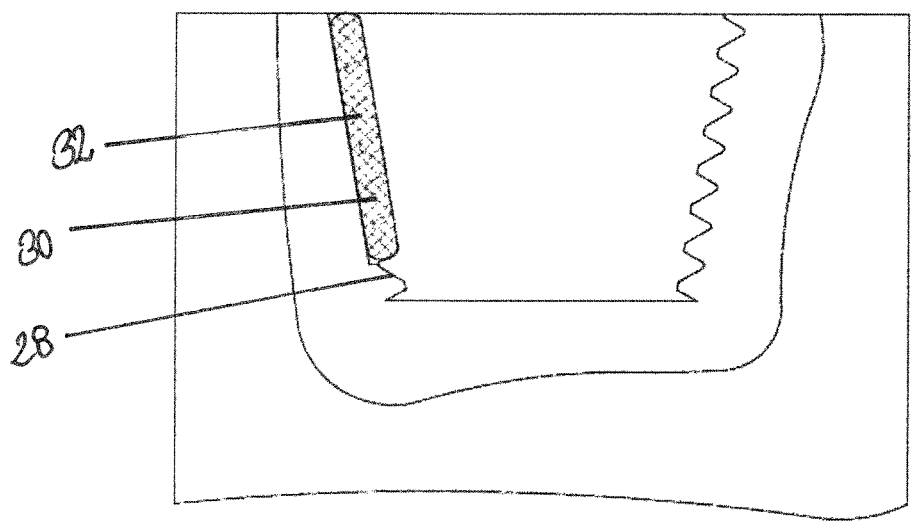

FOIL BAG, CARBON CONTAINING NIPPLE, NIPPLE KIT, CARBON CONTAINING ELECTRODE, ELECTRODE KIT, ELECTRODE-NIPPLE SYSTEM, FURNACE AND METHOD OF OPERATING THE FURNACE

CROSS-REFERENCE TO RELATED APPLICATION

This is a continuation application, under 35 U.S.C. § 120, of copending international application No. PCT/EP2014/067273, filed Aug. 12, 2014, which designated the United States; this application also claims the priority, under 35 U.S.C. § 119, of German patent application No. DE 10 2013 216 452.1, filed Aug. 20, 2013; the prior applications are herewith incorporated by reference in their entireties.

BACKGROUND OF THE INVENTION

Field of the Invention

The present invention relates to a foil bag that is filled with an adhesive mixture for securing an electrode/nipple connection. Moreover, the invention relates to a line of bags containing not less than two foil bags according to the invention. The invention further relates to a nipple with a nipple thread, in particular for carbon-containing electrodes, and a nipple kit containing the nipple and an adhesive container as well as a carbon-containing electrode, in particular for arc furnaces, containing an electrode box with a box thread, and an electrode kit containing the electrode and an adhesive container. The invention also relates to an electrode/nipple system as well as the use of the nipple according to the invention and the electrode according to the invention or the nipple kit according to the invention or the electrode kit or the electrode/nipple system according to the invention for melting steel or steel scrap in an arc furnace. Finally, the invention relates to a method for producing or extracting, recycling, or processing of steel, copper, silicon, calcium carbide, phosphorus, or other materials in an arc furnace or ladle furnace and for creating a secure connection between the nipple and the electrode.

Besides steel production from iron ore via the blast furnace route, for a considerable time period now, steel has also been produced from steel scrap, iron sponge, and raw iron in arc furnaces. This method regularly involves the use of graphite electrodes, regardless of whether alternating current or direct current is used.

The electrodes used in this process are exposed to high thermal and mechanical stresses. The arc between the molten metal and the electrodes creates temperatures higher than 3,500° C. During the melting process, the electrode material is continually being consumed, which results in the electrodes getting continuously shorter. However, in order to keep a consistent distance between melt and electrode, which is needed for dependable melting, the electrode is continuously fed into the furnace. Electrodes, e.g., graphite electrodes, are not available in any desired length. For practical reasons, there has been a move towards using electrode columns consisting of several electrode segments that are screwed together. For the screw connection, double conical nipple threads, for example, are being utilized, as disclosed in U.S. patent publication No. 2002/0142164. As soon as the electrode length is no longer sufficient, a new electrode segment can be screwed into the (almost) consumed electrode segment, thus keeping the continuous melting process going. Due to the intense thermal and mechanical stresses that the continuously shortened electrode is exposed to, there has been a series of attempts to secure the screw connection between nipple and electrode against getting loose, e.g., by using adhesive compounds or putty-like materials.

Thus, in German patent DE 42 40 473, a mixture is proposed that is at least partly melting and coking under the influence of temperature containing a substance that is melting and coking under the influence of temperature, consisting of a complex mixture of heat-polymerized, low-molecular, aromatic hydrocarbons that can contain alkyl side chains and hydroxyl groups. This mixture has a softening point (DIN 52052) in the area of 50 to 120° C., a content of toluene insolubles of maximum 2.5%, a content of benzopyrene of less than 50 ppm and a viscosity (at 160° C.) in the range of 300 to 8,000 mPa-s. When using this mixture, screw joints between electrodes made from carbon or graphite and a threaded nipple made from carbon or graphite are allegedly designable in a particularly secure manner, especially if, additionally, an extension on the front side extends into a complementary inlet in the thread box of an electrode that is being connected. The measures proposed above involve a considerable effort with regard to materials and processes and are often not compatible with the requirements for an undisturbed continuous process management.

In U.S. patent publication No. 2005/0271114 A1, it is proposed that an adhesive-containing disc on the front side between the screwed-in nipple and the bottom of the electrode thread box be provided. During screwing-in or heating, the adhesive material flows into grooves that run in perpendicular direction to the center thread, which is meant to help spread the adhesive compound. However, in U.S. patent publication No. 2005/0271114 A1, it is also simultaneously proposed that additional holes transversely to the longitudinal axis of the nipple be provided and that they be filled with an adhesive compound. These holes should discharge into the the grooves. Again, when heated, the adhesive material is supposed to come out of these holes and spread down the grooves. The technical teaching of U.S. patent publication No. 2005/0271114 A1 provides for adhesive material to be released in the screwed-in or almost screwed-in state in order to achieve a better connection between nipple and electrode, thus making it more secure.

A refinement of the method proposed in U.S. patent publication No. 2005/0271114 A1 can be found in published European patent application EP 1 565 040 A1. Here, the grooves are preferably supposed to run obliquely to the thread of the nipple, which is a double-conical nipple, and to also have an extension that is limited in such a way that at least one complete orbit of the thread remains. This design of the groove that receives adhesive material in the screwed-in state also requires additional holes that are filled with adhesive compound and that extend transversely to the longitudinal axis of the nipple and discharge into the groove. When heated, the adhesive compound is supposed to flow into the groove in order to contribute to a more secure connection between electrode and nipple.

According to German patent DE 693 14 385 (corresponding to U.S. Pat. No. 5,407,290), grooves can be avoided, if at least four holes are present in vertical direction to the longitudinal axis of the nipple that are alternately filled with a pitch cement to which a foaming agent has been added, and with a synthetic cement made from thermally curable resin. The synthetic cement is supposed to melt in the presence of a catalyst at a temperature above 60° C. in order to form a liquid phase with a viscosity of less than 2,500 mPa-s between 90° C. and 120° C. and to polymerize at a temperature of higher than or equal to 120° C.

U.S. Pat. No. 3,717,911 also utilizes holes in the nipple thread. This hole or these holes, however, run mainly in parallel direction to the longitudinal axis of the nipple. Through these holes, adhesive compound is supposed to get to the front surface of the nipple in the screwed-in state and spread between the front surface and the bottom of the box thread, thus contributing to a firm connection.

According to German patent DE 1 071 249, a self-curing adhesive compound for securing the screw connection in the case of carbon or graphite electrodes can be packaged in a plastic cover and placed between the front surface of the nipple thread and the bottom of the thread box. When the thread nipple is fully screwed in, the plastic cover of the adhesive compound bursts, so that the adhesive compound is pressed into the existing inlets and grooves of the nipple and box thread in the already known manner.

The technical teaching of U.S. patent publication No. 2002/0142164, however, does not need a plastic cover, as it provides expandable mixtures from intercalated graphite flakes and pitch to be placed in a custom-fit fashion into inlets that are present on the front side of a double-conical nipple thread. The characteristics of the material used have to be such that it expands when exposed to rising temperatures. In this way, a connection via an adhesive compound is supposed to be established between the nipple thread and the box bottom.

In German patent DE 1 186 959 (corresponding to U.S. Pat. No. 3,140,967), a method for connecting two carbon-containing electrodes via a double-conical thread nipple is proposed, according to which, a bag with an adhesive compound has to be placed on each side of the nipple between the respective front side of the nipple and the box bottom of the individual electrodes. Both bags with adhesive compounds have to be of such dimensions that, by means of the spatial effects of both bags, a symmetrical position of the nipple relative to the two electrode boxes can be ensured. Only then are the electrodes to be tightly screwed together with the double-conical nipple, whereby the covers of both bags are simultaneously destroyed and the individual adhesive compounds spread between the nipple and the electrode. In this way, a symmetrical screw connection with simultaneous cementing of nipple and electrodes is to be achieved. This is aimed at preventing the electrode boxes from tearing or bursting during operation. In addition to that, this document suggests that longitudinal grooves in the nipple thread be provided that would substantially run in perpendicular direction to the nipple thread and would have a depth that would correspond to the thread depth of the nipple thread.

A similar method is disclosed in German patent DE 1 290 642 (corresponding to U.S. Pat. No. 3,140,967). For this method, it is of particular importance to use elastic cover material for the bag containing the adhesive compound. A polyethylene foil is given as an example.

Alternatively, the attempt has been made according to German patent DE 103 12 170 to improve the connection between nipple thread and box thread by using carbon fiber with an oxidatively activated surface that is additionally equipped with a carbonated coating. Hereby, the carbonated coating is required to be the carbonization product of a coating agent chosen from wax, pitch, natural resins, as well as thermoplastic and thermosetting polymers.

Furthermore, attempts have been made to alternatively achieve an improved connection between nipple thread and box thread by paying particular attention to the geometry of the thread forms. Thus, in German patent DE 60 2004 006 939 (corresponding to U.S. Pat. No. 6,952,438), it is proposed that the internal thread of an electrode box and the external thread of a nipple have substantially homogeneous pitches, a flank end, and a flank base, as well as individual thread turns with substantially a V profile. Furthermore, at least the external thread or at least the internal thread have to be formed with a wedge ramp on the flank base, whereby when such an external part is screwed together with such an internal part, the flank ends of one of these parts abut against the wedge ramp of the other part, and whereby the internal thread and the external thread are formed conically and no load is applied to the flanks of the individual thread turns.

SUMMARY OF THE INVENTION

All of these methods, as well as the electrode/nipple connections known from prior art, still leave a lot to be desired. Hence, the present invention is based on the goal of making the electrode/nipple connection of carbon-containing electrodes even more stable and dependable. The invention was also based on the task of configuring the electrode/nipple connection in such a way that, under appropriate conditions of use, a connection still remains, even when the electrode box of the electrode is slightly ripped, torn or burst—preferably even when the electrode has been almost completely consumed, or only a stub of the electrode remains. Correspondingly, the invention was particularly based on the task of eliminating or at least reducing the creation of so-called falling leftover pieces, i. e., residue pieces of electrodes or nipples or remainders of electrodes or nipples that get loose due to a lack of adhesion or support. In addition to that, the invention was also based on the goal of providing means that would enable the electrode or electrode box and nipple to be securely and firmly connected with each other in a simple and straightforward manner, particularly without the need to significantly alter established procedures. Finally, the invention was based on the task of providing a simple and dependable method for making an extremely firm electrode/nipple connection available.

The task on which the invention is based is solved by a foil bag, containing or formed from not less than one lamination foil, containing or being made of not less than two laminated plastic foils or not less than one plastic foil and not less than one metal foil, filled with a liquid or pasty, thermally or chemically curing adhesive, in particular a mixture of adhesives, for securing an electrode/nipple connection.

Laminated foils in the sense of the present invention shall contain foils that are connected with each other across the whole surface. For example, two or more foils or foil layers can be connected to each other by lamination. Laminated foils can also be produced by coextrusion. A separate metal foil or a metal foil layer can, for example, be laminated or glued together with a plastic foil. Metal foils in the sense of the invention, however, can also be obtained by vapor coating on a plastic foil.

The liquid or pasty thermally and/or chemically curing or curable adhesive or adhesive mixture for securing an electrode/nipple connection contains in a suitable embodiment a) at least one resin basis and/or b) at least one pitch basis, as well as c) at least one filler material, in particular containing graphite and/or soot particles, preferably with an average particle size of smaller or equal to 0.5 mm, as well as d) possibly, at least one hardening agent, particularly a latent hardener. Preferably, the adhesive or the adhesive mixture contains at least one resin basis and/or at least one pitch basis and at least one filler material that contains graphite and/or soot particles with an average particle size smaller or equal to 0.5 mm. For example, it can be provided for the resin basis to be or comprise at least one phenolic resin basis, at least one epoxy resin basis, at least one cyanate ester resin basis, and/or at least one furfuryl alcohol resin basis. The use of phenolic resins proved to be particularly advantageous—for example, phenolic resins that were obtained by utilizing a hexamine catalyst. Mixtures from phenol and pitch are also often used, as they are particularly suitable. Suitable filler material can be chosen from graphite dust, graphite powder, ground graphite foil, and soot. Suitable graphite includes natural graphite, expanded graphite, synthetic graphite, or any mixtures thereof. The average particle size of the graphite or soot particles lies preferably not above 0.4 mm and, particularly preferred, not above approx. 0.3 mm, and can also range in the area of 0.2 to 0.4 mm, whereby average particle sizes in the micrometer range can, of course, also be used, e.g., in the area of 30 µm to 90 µm. Preferably, the graphite particles are made of or comprise expanded graphite powder, in particular with a carbon content greater than or equal to 85% by weight, established according to DIN 54903 (800° C., 20 h) and/or in particular with a particle size $D_{50}$ in the area of 1 µm to 100 µm, established by means of laser diffraction (according to ISO 13320). The value D50 indicates the average particle size, i. e., D50 means that 50% of the particles are smaller than the specified value. In a particularly preferred scenario, the graphite powder has a carbon content of greater than or equal to 90 percent by weight, and preferably greater than or equal to 95 percent by weight, and/or a particle size $D_{50}$ in the area of 1 µm to 50 µm and preferably in the area of 2 µm to 15 µm.

Suitable adhesives or adhesive mixtures can further contain at least one hardening agent and/or at least one propellant, in particular respectively comprising at least one carbon-containing acid. Among suitable hardening agents, chloranil can be named, for example. Hardening agents from among so-called latent hardening compounds proved to be particularly suitable. As an example of a suitable latent hardener, hexamethylenetetramine (Urotropin) can be specified.

Correspondingly, among the propellants are particularly preferred those that deliver hardening catalysts as decomposition products. As examples, benzenesulfonyl hydrazide, and derivates of benzenesulfonyl hydrazide, p-toluenesulfonic acid, ammonium phosphate, and phosphoric acid can be mentioned.

The suitable adhesives or adhesive mixtures cure, for example, at temperatures in the range of room temperature (20° C.) to approximately 250° C., preferably in the range of, e.g., 50° C. to 200° C. or in the range of 80° C. up to 180° C., particularly preferred in the range of 100° C. to 150° C. or in the range of 120° C. to 140° C., in a particularly pragmatic embodiment, within not longer than 10 minutes, particularly preferred in not longer than five minutes.

Furthermore, it can be provided for the adhesive or the adhesive mixture to be made available, not as a homogeneous product mixture, but rather in the form of an adhesive mixture kit, with the hardening agent forming a separate component. By providing kits like that, the suitability for storage can be improved. The curable adhesive mixture is prepared by mixing the components together prior to the actual use.

As an example for suitable adhesive mixtures, we refer to the compositions disclosed in CN 2010/1586493. In addition to a thermally curable resin, these compositions contain expanded graphite, not expanded graphite powder, a hardening agent, and kerosene coal dust, as well as, possibly, pitch.

In a particularly practical embodiment, it can be provided for the lamination foil to consist of or contain at least one metal foil, in particular aluminum foil, and at least one plastic foil, in particular a polyolefin and/or polyester foil.

Furthermore, it can be provided for at least one lamination foil to comprise or consist of an at least three-layer foil, with at least two plastic foils and at least one metal foil positioned between them, in particular an aluminum foil.

Foil bags according to the invention have proved to be particularly practical that consist of a lamination foil having on the inside of the bag at least one polyolefin foil, in particular a polyethylene foil or a polypropylene foil, and on the outside of the bag at least one polyester foil, in particular a PET foil, preferably having an aluminum foil positioned in-between them.

In order to ensure a dependable release of the adhesive mixture in every single case, such foil bags according to the invention are preferred, which are equipped with at least one weakening area, in particular a perforated area, and/or at least one weakening line, in particular a perforated line. Hereby, the minimum of one weakening area, in particular the perforated area, and/or the minimum of one weakening line, in particular the perforated line, can be configured in such a way that it extends in sections or substantially entirely from one end of the bag to the opposite end and/or on the same side of the bag.

The foil bag according to the invention can be a single-chamber bag or a multi-chamber bag. Using a multi-chamber bag is beneficial in some cases, as the individual chambers ensure a more extensive and/or dependable destruction of the adhesive bags when the nipple thread is being screwed into the box thread also known as a socket thread, which regularly results in a more extensive release of the adhesive or the adhesive mixture. In a preferred scenario, the adhesive or the adhesive mixture are available in the form of an adhesive-mixture kit, whereby the hardening agent forms a separate component.

Hereby, embodiments can be used that are configured in such a way that the bag according to the invention is divided into several, particularly two, adhesive-containing chambers, that are separated from each other by at least one separation section and are, in particular, next to each other, and that each respectively contain at least one component of the adhesive-mixture, in particular the adhesive mixture-kit, whereby preferably each of the adhesive-containing chambers have the minimum of one weakening area, in particular a perforated area, and/or the minimum of one weakening line, in particular a perforated line, that extend in particular substantially from one end of the bag chamber to the opposite end of the bag chamber and/or on the same side of the bag chambers.

The foil bags according to the invention not only enable the specific destruction and resulting release of the adhesive contained therein or the adhesive mixture contained therein, but also the secure and lasting safekeeping and storage as well as the secure transport of the adhesives and the adhesive mixtures. You do not have to worry about evaporation or release of solvents or other adhesive components. A premature curing of the adhesives or adhesive mixtures contained in the foil bags can also be prevented, if foil bags according to the invention are used. Air or oxygen and/or humidity do not regularly enter the foil bag according to the invention.

The task that the invention is based upon is further solved by a line of foil bags, containing at least two—preferably a multitude of—foil bags that are available in a series and connected to each other.

The line of foil bags according to the invention is available in series, when, for example, one end of a foil bag is connected to the end of the next foil bag directly, for example, divided only by a lateral weld seam, or indirectly, for example, divided only by a sealed-off foil section, and when, in turn, the opposite end of this adjacent foil bag is connected to the end of yet another foil bag, whereby this manner of stringing together individual and respectively adjacent bags can be respectively continued in this way. In this way, the multitude of bags arranged in series receives a longitudinal orientation. Such a line of oil bags can, for example, be reeled onto a shaft similar to a chain or a thick rope.

In a particularly practical embodiment of the foil bag according to the invention, the foil bag consists of or comprises at least one, preferably substantially continuous, lamination foil.

The transition area between two adjacent foil bags is preferably formed by two lamination foils that are welded together. This enables a production method of lines of foil bags according to the invention that is very procedurally efficient and material-saving. It does not involve connecting initially separate individual foil bags with each other (which would also be a possible variant). Rather, a continuous lamination foil film is welded together on the sides and on the opposite ends, thus forming foil bags. Of course it is also possible, and even particularly practical, to weld together two foil films that are arranged lying one on top of the other, thus forming a series of foil bags, where one foil bag is following the other. The transition areas between two adjacent foil bags are then formed by two foil films that are welded together.

Thus, in a suitable embodiment, the line of foil bags according to the invention can be formed from at least one, preferably substantially continuous, lamination foil, or comprise such a foil.

In an alternative or additional design, the separation areas between adjacent foil bags that are arranged in series are substantially arranged aligned in one direction—in particular, merging into each other. Such a separation area can be, for example, a weld seam or a welded-together foil section. In a pragmatic embodiment, this weld seam or separation area runs substantially in the same direction as the longitudinal extension of the line of foil bags, in particular substantially parallel to its side edges. Of course, there can be two or more separation areas, e.g., in the form of welding lines or welding areas, arranged next to each other, thus dividing the foil bags or the line of foil bags into three or more chambers that are either all filled with the adhesive or with individual components that form the adhesive.

Such foil bags or lines of foil bags according to the invention contribute to solving the task in a particularly practical manner, which have the weakening areas or weakening lines of the foil bags, in particular foil bags that are arranged next to each other, extending substantially in the same direction as the foil bags that are arranged in series, and in particular are arranged relative to the form of the foil bags substantially in the same direction and/or substantially extending from one end of the line of foil bags to the opposite end of the line of foil bags and/or are present in particular on the same side of the line of foil bags.

The task that the invention is based on is further solved by a carbon-containing nipple with at least one nipple thread, in particular for carbon-containing electrodes, containing at least one inlet (also called first inlet) in the minimum of one nipple thread, suitable for receiving minimum of one adhesive container containing a liquid or pasty thermally and/or chemically curing adhesive, in particular an adhesive mixture, for securing an electrode/nipple connection, in particular in all nipple threads, in particular a groove (also called first groove) that runs across the nipple thread, in particular in perpendicular direction to the thread, whereby the inlet, in particular the groove, is at least in sections—in particular substantially entirely—undercut.

Hereby, the first inlet, particularly the groove, can, preferably in the undercut section, be deeper or higher than the thread depth or can have a depth that substantially corresponds to the thread depth. In a particularly preferred design, the depth of the first inlet or the first groove is deeper than the thread depth.

In a particularly preferred embodiment, the inlet, in particular the groove, has substantially a trapezoidal cross section.

Suitable carbon-containing nipples contain nipples from carbonated or graphitized material as well as from carbonated and graphitized material.

A carbon-containing nipple is regularly configured in such a way that it connects two carbon-containing electrodes with each other. This is achieved in the most practical manner by using a so-called double nipple that has nipple threads on the respectively opposite sides, or that has a thread extending from one end of the nipple to the opposite end of the nipple. Hereby, first and/or second inlets or grooves can be present only in one as well as in both nipple threads of the double nipple. The inlets that are present in both nipple threads can be arranged symmetrically as well as asymmetrically relative to each other. In these inlets, particularly in the two nipple threads that are opposite each other, the adhesive containers described here can be present. A nipple thread in the sense of the present invention—independent of it being formed on a carbon-containing nipple or a carbon-containing electrode—is a thread that is suitable for insertion into a box of a carbon-containing electrode, i.e., for being screwed into the box thread in order to actually connect two carbon-containing electrodes with each other.

Cylindrical or double-conical threaded double nipples proved to be particularly practical.

Nipples according to the invention also include nipples that have an additional second groove that is not undercut like the first groove and that runs across the nipple thread in particular substantially in perpendicular direction to the thread.

The task that the invention is based upon is further solved by a nipple kit containing at least one carbon-containing nipple, in particular for carbon-containing electrodes, at least one inlet in the minimum of one nipple thread, in particular in all nipple threads, in particular a groove that runs across the nipple thread, in particular substantially in perpendicular direction to the thread, in particular a carbon-containing nipple according to the invention, and at least one adhesive container, in particular present in the inlet, containing a liquid or pasty thermally and/or chemically curing adhesive, in particular an adhesive mixture, for securing an electrode/nipple connection, in particular a bag according to the invention and/or at least one line of bags according to the invention. Whereby the adhesive container optionally has at least one weakening area, in particular a perforated area, and/or at least one weakening line, in particular a perforated line, preferably extending from the one end of the adhesive container to the opposite end of the adhesive container and/or formed on the same side of the adhesive container.

Hereby, at least one, in particular bag or adhesive container according to the invention, for example, at least one line of bags according to the invention, containing a liquid or pasty thermally and/or chemically curing adhesive mixture for securing a nipple/electrode connection, can be present in the minimum of one inlet, in particular a groove, and in the minimum of one second inlet, in particular a second groove.

The adhesive container can be produced from diverse materials. These materials should be able to prevent the premature curing of the adhesive or the adhesive mixture contained therein during the storage period, should not react with the adhesive themselves, be robust enough not to be damaged at filling, at transport, or during appropriate handling, and nevertheless be able to be torn open, when the nipple thread and the box thread engage with each other, thus releasing the adhesive. Suitable materials for the adhesive container comprise, for example, plastic foils that have one layer or consist of several layers or are laminated, as well as packages made from paper or composite paper, if required, laminated with a metal layer and/or silicone layer. The adhesive containers can be provided as bags, i.e., as containers with flexible walls; however, they can also take on any other form of containers—for example, cardboard or cardboard-like packages, i.e., with walls that are not flexible, but dimensionally stable to a certain extent.

The explanations, for example, regarding the alignment and type of weakening areas or lines or of perforation areas or lines, as described above for the bags and lines of bags according to the invention, apply naturally in the same way and generally also to the adhesive containers used for the items according to the invention.

In the case of the nipple kit according to the invention, the adhesive container, for example, the bag or line of bags, can be present in the first or in the second inlet or groove, but not necessarily so, whereby, however, the first embodiment is preferred. However, the adhesive container, for example, the bag or line of bags, has to be suitable and prepared to be placed or fitted into this first or second inlet or groove.

Thereby the design can be such that at least one inlet (first inlet), in particular a groove (first groove), is undercut and/or that at least one inlet (also called second inlet), in particular at least one groove (also called second groove), is not undercut.

The adhesive that is contained within the adhesive container, in particular the foil bag or line of foil bags, is not yet cured while it is inside the undamaged container. In other words, the adhesive or the adhesive mixture that is inside this adhesive container is available as a so-called curable or hardening adhesive. For curing to take place, it needs to be initiated, for example by coming into contact with the oxygen or humidity of the air or by being blended with a suitable initiator/hardening agent.

Accordingly, the task that the invention is based upon is further solved by a nipple with a nipple thread, in particular for carbon-containing electrodes, containing at least one second groove that runs across the nipple thread particularly substantially in perpendicular direction to this thread, and that is not undercut, whereby in the second groove there is at least one line of bags containing a liquid or pasty thermally and/or chemically curing or curable adhesive mixture for securing a nipple/electrode connection, particularly a bag and/or at least one line of bags according to the invention.

Particularly preferred nipples according to the invention are characterized in that the cross-sectional form of the first and/or second inlet, in particular the first and/or second groove, and the cross-sectional form of the adhesive container, in particular the bag and/or line of bags according to the invention, in particular as far as the form and/or size is concerned, substantially correspond to each other.

The cross-sectional shape of the inlet and the cross-sectional shape of the adhesive container, in particular of the bag or line of bags according to the invention, do not only correspond with each other when the dimensions of the adhesive bag are exactly attuned to the dimensions of the inlet, but also, when no such exact conformity exists, the adhesive container can nevertheless be fitted into the inlet. By the fact that the adhesive bag can be fitted into the inlet that is present in the thread, the problem-free screwing-in of the nipple thread into the box thread is ensured on the one hand, and on the other hand, it is ensured that during the screwing-in process this adhesive container is destroyed, and the adhesive is released, due to the threads of the nipple and the box engaging with each other. By the inlet and its relative dimensioning with regard to the adhesive container, particularly concerning its form and size, in the nipple thread and the box thread, it is ensured that during the screwing-in process of the nipple thread into the box thread, the adhesive container is destroyed, and the adhesive is released and spread extensively. Hereby it only needs to be generally ensured, that the adhesive container that has been fitted into the inlet or is present there protrudes above the sectional profile of the nipple thread and box thread, which need to be aligned to each other for practical reasons. Such a protruding of the adhesive container, at least in sections, over the thread profile is already sufficient for protruding over the nipple or box thread. That is, the adhesive container that is present in the preferably undercut inlet does not necessarily have to protrude over the flank end of the nipple thread or box thread, if present in the inlet (although this also would be a practical embodiment according to the invention), but it is already sufficient for the filled adhesive container to protrude above at least one flank base of a nipple thread or box thread, if present in the respective inlet. In this way, the respective threads interact with the adhesive container, and in the end, an adhesive surface is generated that extends much further than the surface covered by the inlet. Hereby a very firm and durable connection between the carbon-containing electrode and the carbon-containing nipple is achieved, even in cases where crack formation in the electrode occurs, which often happens when the electrode is already consumed to a large extent and, e.g., only a so-called stub of the electrode exists. That is, even in cases of crack formation, the stubs of the electrode do not fall off the nipple, but are held in their position due to the adhesive connection. Thus, the present invention particularly solves the task of preventing or, in any case, drastically reducing, the formation of carbon-containing falling leftover pieces (from electrodes or nipples), particularly during producing or extracting, recycling, or processing of, e.g., steel, copper, silicon, calcium carbide, phosphorus, or other materials in an arc furnace or ladle furnace. This results in maximizing the usable electrode material and nipple material and reducing or even avoiding the contamination of the molten material with carbon residues, which simultaneously leads to an optimized and more economical process design.

Especially suitable are such nipple kits according to the invention, where the adhesive container that is present in the minimum of one inlet, in particular a groove, is dimensioned in such a way that it protrudes at least in sections over the nipple thread, whereby the weakening area(s) and/or weakening line(s) are substantially, at least predominantly, in particular entirely, positioned in that portion of the adhesive container that is protruding over the nipple thread.

The task that the invention is based upon is further solved by a carbon-containing electrode, in particular for arc furnaces, containing at least one electrode box with a box thread, whereby, in the box thread, at least one inlet, in particular a groove, is present, suitable for receiving at least one adhesive container that contains a liquid or pasty thermally and/or chemically curing adhesive, in particular an adhesive mixture, for securing an electrode/nipple connection, whereby the groove possibly runs across the box thread, in particular transversely, preferably substantially in perpendicular direction to this thread.

Hereby, it is preferably provided that the third inlet or groove of the electrode is, at least in sections, deeper than the box thread.

Such electrodes proved to be particularly practical, in which the minimum of one inlet (also called third inlet), in particular the minimum of one groove (also called third groove), is undercut and/or that the minimum of one inlet (also called fourth inlet), in particular the minimum of one groove (also called fourth groove), is not undercut. Again, by using an undercut groove, the bag or line of bags containing the adhesive mixture can be securely placed in the groove in such a way that, in case of appropriate use, there is no need to worry about the bag or line of bags getting outside the groove—for example, by slipping out or falling out of the groove.

For this purpose in particular, it is beneficial, if the minimum of one groove (third groove) has a trapezoidal cross section.

A nipple or an electrode is carbon-containing or a carbon nipple or a carbon electrode in the sense of the invention, if it contains graphite, i.e. graphitic carbon, or consists thereof, as well as if it contains non-graphitic, but carbonated, carbon or consists thereof. Naturally, any mixtures from graphitic and non-graphitic, in particular carbonated, carbon can be used for creating the said nipples and/or electrodes. The electrode according to the invention comprises preferably a graphite electrode.

The inlet is regularly incorporated into the nipple thread or electrode thread in such a way that the thread is partially removed or interrupted by it, and the filled adhesive container can be placed inside it. Due to the fact that the inlet is positioned in the area of the thread and not in the bottom area of the electrode box or nipple, it is possible for the first time to achieve a very extensive spreading of the adhesive or adhesive mixture already during the process of screwing in the nipple thread into the box thread. An inlet in the sense of the invention also comprises a hole in the thread—for example, with a circular or oval contour shape.

Furthermore, electrodes according to the invention also solve the problem that the invention is based upon, which have a nipple thread or a further box thread positioned opposite the electrode box with the box thread, particularly as an integrated part of the electrode, whereby this nipple thread of the electrode particularly contains at least one inlet (also called fifth inlet) in the nipple thread, in particular a groove (also called fifth groove), that runs in particular across the nipple thread, preferably in perpendicular direction to the thread.

Of course, the electrodes according to the invention also contains such embodiments that have electrode boxes with box threads positioned on both opposite sides of the carbon-containing electrode, in particularly with such box threads that contain inlets, preferably undercut inlets or grooves for receiving the filled adhesive containers described herein.

The task that the invention is based upon is further solved by an electrode kit, containing at least one electrode according to the invention and at least one adhesive container, in particular present in the minimum of one inlet in the box thread and/or nipple thread, containing a liquid or pasty thermally and/or chemically curing adhesive, in particular an adhesive mixture, for securing an electrode/nipple connection, in particular a bag and/or line of bags according to the invention. Whereby the adhesive container optionally has at least one weakening area, in particular a perforated area, and/or at least one weakening line, in particular a perforated line, preferably extending from the one end of the adhesive container to the opposite end of the adhesive container and/or formed on the same side of the adhesive container. Thus, a particularly favorable and practical further development of the electrode according to the invention contains at least one bag or at least one line of bags, containing a liquid or pasty thermally and/or chemically curing or curable adhesive mixture for securing a nipple/electrode connection, particularly a bag and/or at least one line of bags according to the invention, whereby the bag and/or the line of bags is present inside the minimum of one third groove.

Hereby it is beneficial to make sure that the cross-sectional shape of the third and/or fourth and/or fifth inlet, in particular the third and/or the fourth and/or the fifth groove, and the cross-sectional shape of the adhesive container, in particular of a bag according to the invention and/or line of bags according to the invention, substantially correspond to each other, particularly with respect to their shape and size.

Such an electrode kit according to the invention solves the task that the invention is based upon in a practical manner, where the adhesive container that is present in the minimum of one inlet, in particular a groove, is dimensioned in such a way that it protrudes at least in sections over the box thread and/or the nipple thread, whereby the weakening area(s) and/or weakening line(s) are substantially, at least predominantly, in particular entirely, positioned in that part of the adhesive container that is protruding over the box thread and/or the nipple thread.

The task that the invention is based upon is further solved by an electrode/nipple system, which is obtained by screwing-in of one nipple thread of a carbon-containing nipple, in particular of a nipple thread of the nipple according to the invention or of the nipple kit according to the invention or of the electrode according to the invention and/or the electrode kit according to the invention having a nipple thread, into the box thread of the thread shaft of a carbon-containing electrode, in particular for arc furnaces, in particular of an electrode according to the invention, and/or an electrode kit according to the invention, whereby the nipple thread and/or the box thread has at least one inlet, in particular a groove, containing at least one adhesive container that contains a liquid or pasty thermally and/or chemically curing adhesive, in particular an adhesive mixture, for securing the electrode/nipple or electrode/electrode connection, in particular at least one bag according to the invention and/or at least one line of bags according to the invention, involving at least partial destruction of the adhesive container, in particular in the area and/or along the minimum of one optional weakening area or at least one weakening line, and involving release of the adhesive and, if applicable, of the hardening agent or the adhesive mixture.

From among the electrode/nipple systems according to the invention, those systems proved to be particularly practical, where the minimum of one weakening area, in particular a perforated area, and/or the minimum of one weakening line, in particular a perforated line, substantially extend from one end of the adhesive container to the opposite end of the adhesive container, and/or are positioned on the same side of the adhesive container.

Thereby it can be provided for the inlet to be the first, second, third, fourth, and/or fifth inlet, in particular the first, second, third, fourth, and/or fifth groove.

Especially favorable are variants of the embodiment, where the adhesive container that is present in the inlet, in particular in the first, second, third, fourth, and/or fifth inlet, preferably the first, second, third, fourth, and/or fifth groove, is dimensioned in such a way that—prior to or during the screwing-in of the nipple thread into the box thread—it is protruding at least in sections over the nipple thread or the box thread, whereby preferably the weakening area(s) and/or weakening line(s), substantially, at least predominantly, in particular entirely, are positioned in the area of the adhesive container that is protruding over the nipple thread or the box thread.

The bag according to the invention and/or the line of bags according to the invention and/or the nipple according to the invention and/or the nipple kit according to the invention and/or the electrode according to the invention and/or the electrode kit according to the invention and/or the electrode/nipple system according to the invention are utilized for reducing or eliminating falling leftover pieces of carbon-containing electrodes and/or nipples and/or during metallurgical processes in an arc furnace or a ladle furnace, in particular during melting of steel or steel scrap, or during producing or extracting, recycling, or processing of calcium carbide, copper, silicon, phosphorus, or other materials.

Moreover, the task that the invention is based upon is solved by a method for producing or extracting, recycling, or processing of steel, copper, silicon, calcium carbide, phosphorus, or other materials in an arc furnace or a ladle furnace, containing the screwing-in of a nipple thread of the nipple kit according to the invention into a corresponding box thread of a carbon-containing electrode; or the screwing-in of a nipple thread of the electrode kit according to the invention, whereby the electrode has a nipple thread in addition to the box thread, into a corresponding box thread of a carbon-containing electrode; or the screwing-in of a nipple thread of a carbon-containing nipple into a corresponding box thread of an electrode kit according to the invention; or the screwing-in of a nipple thread of a nipple kit according to the invention into a corresponding box thread of an electrode kit according to the invention, each involving the destruction of at least one foil bag during screwing-in and involving the release of the liquid or pasty thermally and/or chemically curing adhesive, in particular adhesive mixture. The spreading of the released adhesive, in particular the adhesive mixture, during screwing-in beyond the surface covered by the inlet, in particular the groove, between nipple thread and box thread. The curing of the released adhesive, in particular adhesive mixture, in particular at higher temperatures, for example in the area of room temperature to 250° C., preferably in the area above 50° C., and/or preferably over a time period of at least five minutes.

One of the advantages of the invention lies in the fact that the adhesive, which is released during screwing-in of the nipple thread into the box thread and subsequently spread over a wide surface due to the turning movement, hardens under the operating conditions of the electrode. Usually, the end of the electrode that connects to the nipple has a temperature in the range of approximately 100° C. Consequently, there is no need for an additional work step. The routine procedures or process steps do not have to be altered and can be left as they are.

Finally, the task that the invention is based upon is solved by an arc furnace or a ladle furnace, in particular for producing or extracting, recycling, or processing of steel, copper, silicon, calcium carbide, phosphorus, or other materials, containing at least one nipple according to the invention and/or at least one nipple kit according to the invention and/or at least one electrode according to the invention and/or at least one electrode kit according to the invention or at least one electrode/nipple system according to the invention. Suitable furnaces include hereby DC furnaces as well as AC furnaces. The items of the invention can not only be used in primary metallurgical processes but also in secondary metallurgical processes.

Other features which are considered as characteristic for the invention are set forth in the appended claims.

Although the invention is illustrated and described herein as embodied in an improved electrode/nipple connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is a diagrammatic, side view of a nipple according to the invention that is connected to an electrode;

FIG. 9 is a diagrammatic, sectional view of an electrode connection without a nipple;

DETAILED DESCRIPTION OF THE INVENTION

Figure 1A:
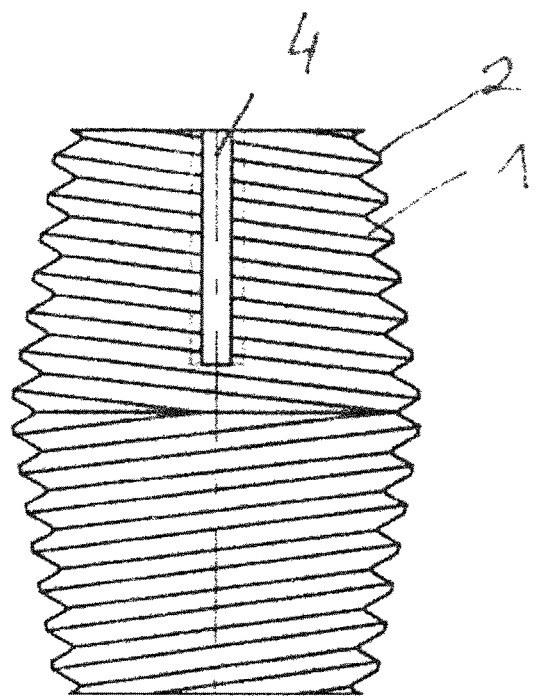
FIGS. 1A and 1B are diagrammatic, side views of a double-conical nipple according to the invention with one or two grooves extending substantially in vertical direction relative to the nipple thread.
Figure 1B:
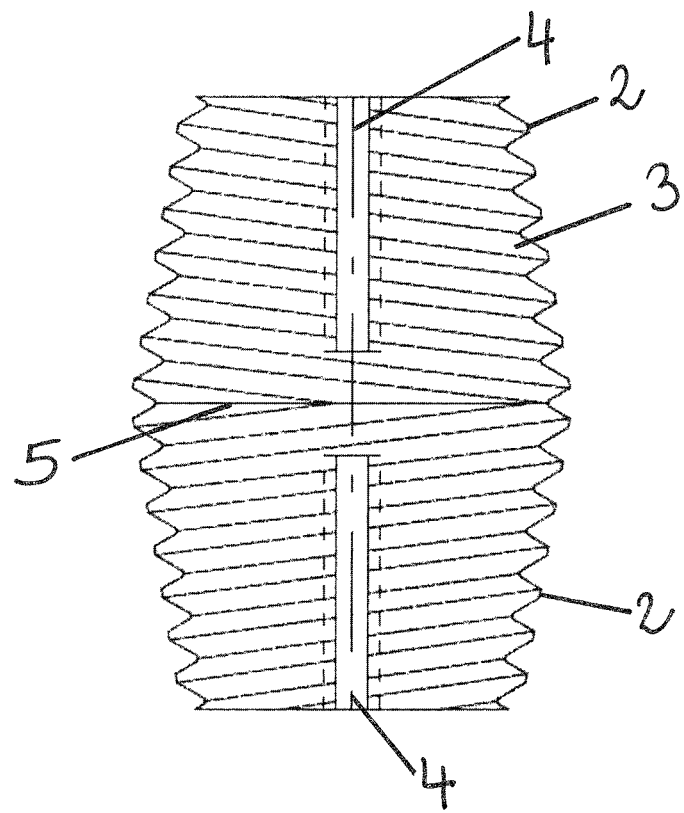
Figure 2A:
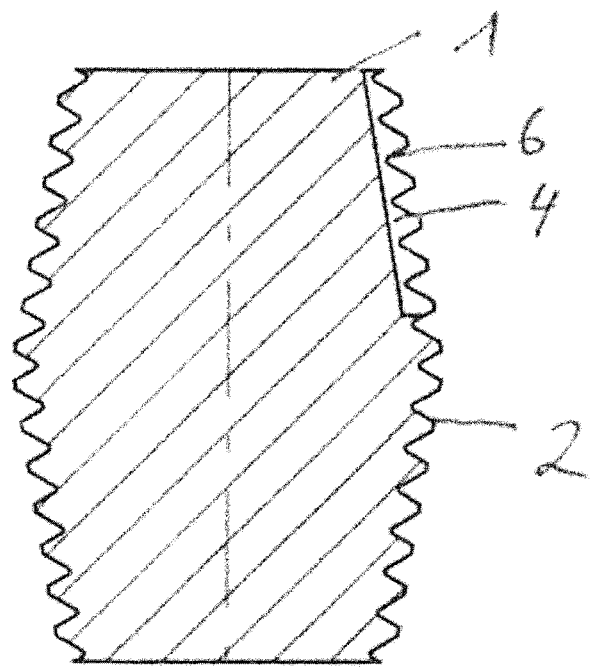
FIGS. 2A and 2B are side views of the nipples according to FIGS. 1A and 1B.
Figure 2B:
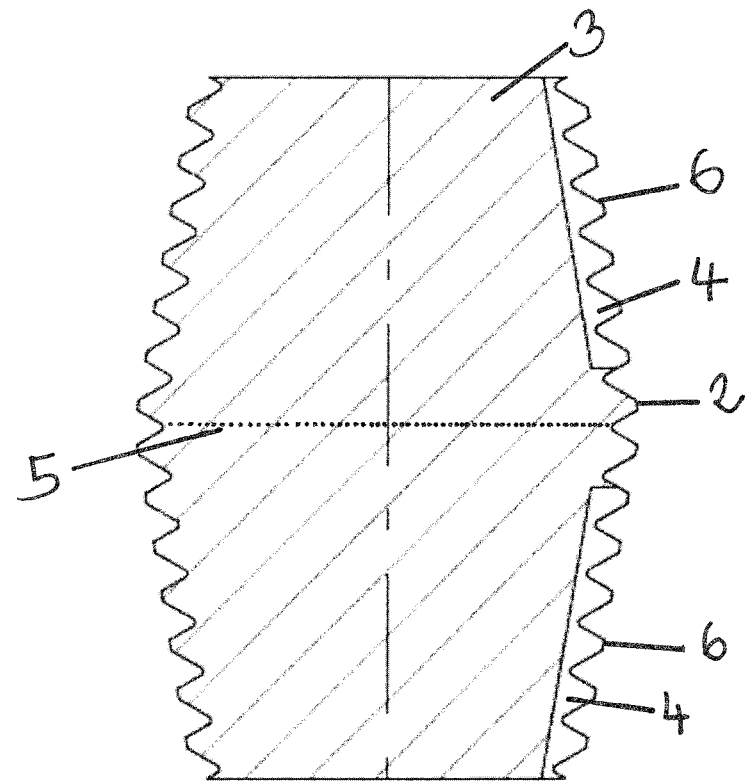

Referring now to the figures of the drawings in detail and first, particularly to FIG. 1A there is shown a double-conical nipple 1 according to the invention with a nipple thread 2, which is crossed by a first undercut groove 4 that extends across the nipple thread 2 substantially perpendicular to the nipple thread 2, covering nearly all of an upper half of the nipple thread 2. As can be seen in FIG. 2A, a depth of the groove 4 expands deeper than a depth of convolutions 6 of the nipple thread 2. FIGS. 1B and 2B show in a corresponding manner a double-conical nipple 3 that has the respective groove 4 on both sides of an equator 5, into which destructible adhesive containers can be fitted. The FIGS. 1B and 2B depict a symmetrical embodiment of the nipple 3.

Figure 3A:
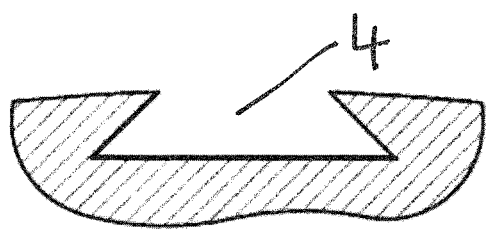
FIGS. 3A to 3C are cross-sectional views of grooves in nipples according to the invention.
Figure 3B:
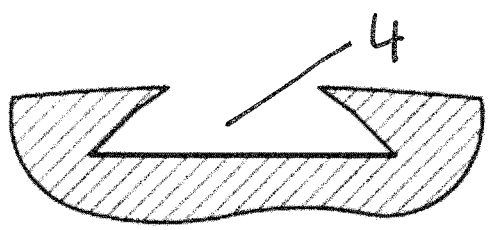
Figure 3C:
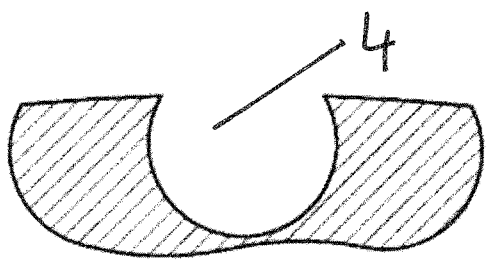

FIGS. 3A-3C show three embodiments of undercut first grooves 4, which can all be used with the nipple thread 1 or 3 according to the invention, as well as with the electrode according to the invention. While the groove cross section according to FIG. 3A is trapezoidal and that of FIG. 3B substantially trapezoidal, the undercut groove according to FIG. 3C is provided in the cross-sectional shape of a circle section.

Figure 4A:
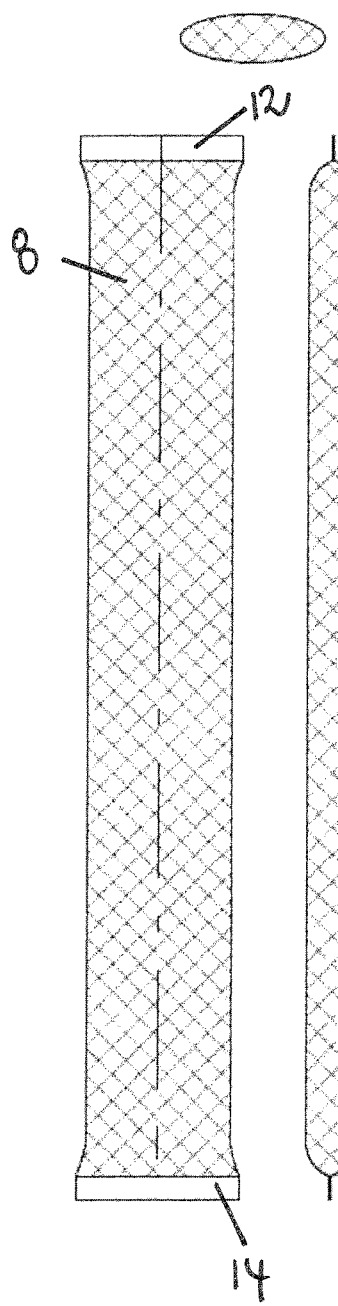
FIGS. 4A to 4F are diagrammatic, side views and cross sectional views of foil bags and lines of foil bags according to the invention.
Figure 4B:
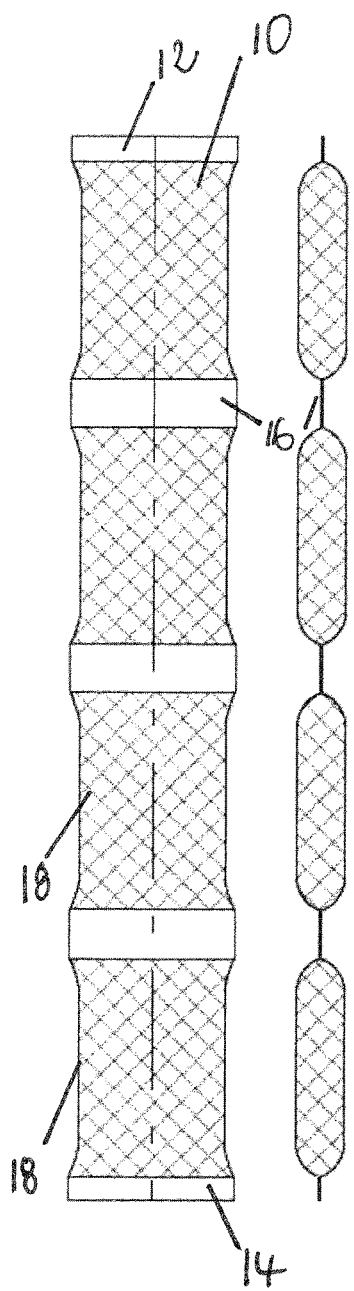
Figure 4C:
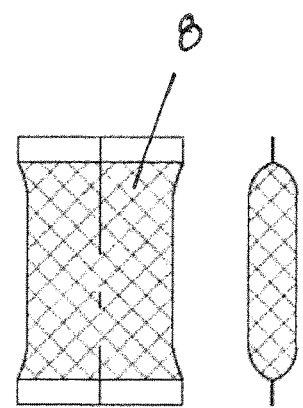
Figure 4D:
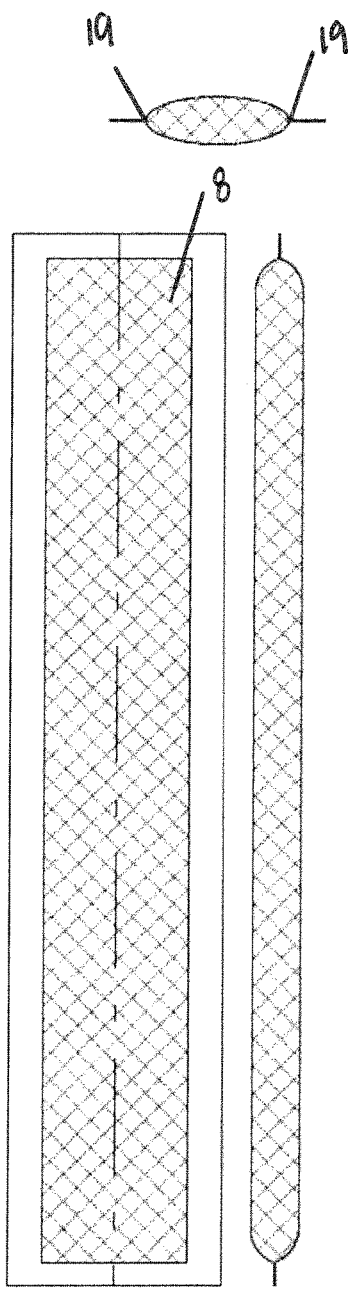
Figure 4E:
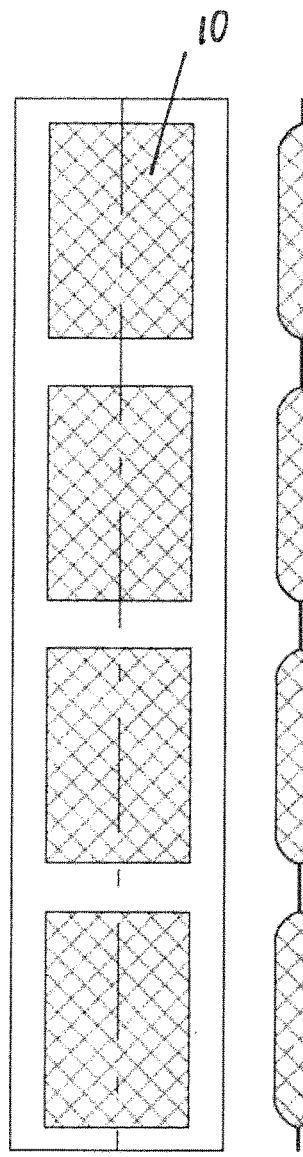

The FIGS. 4A to 4F show different configurations of foil bags according to the invention (configurations in FIGS. 4A, 4C, 4D and 4F) and of lines or rows of foil bags according to the invention (configurations in FIGS. 4B and 4E). The cross-sectional views and longitudinal section views of the respective foil bags and lines of foil bags that are also shown in the figures are configured in such a way that they correspond to the form of the grooves in the nipple threads 2 and electrodes according to the invention, as can be easily seen in the FIGS. 5A to 5F.

In case of the embodiments of the foil bags according to the invention shown in FIGS. 4A to 4C, a foil sleeve was used that was either welded (e.g. closed) on both opposite ends, as far as the foil bags are concerned (see FIGS. 4A and 4C), or has several additional welded transition sections or areas 16. If the described method of creating welded foil areas 16 is used, a foil strip results having foil bags 18 that are arranged in series, one after the other. That is, opposite a first welding 14 of the foil bag, there is another welding (reference sign 16), which in turn merges into an adjacent foil bag 18 after the same longitudinal extension, whereby the foil bag 18 is sealed off by a welding that is positioned opposite the first welding 16.

Figure 4F:
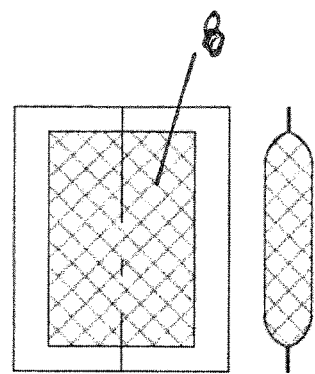
Figure 5A:
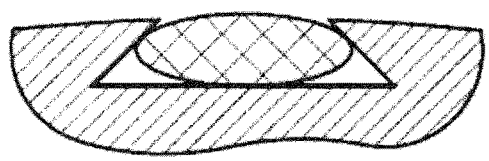
FIGS. 5A to 5E are diagrammatic, cross sectional views of grooves in nipples according to the invention that are filled with bags according to the invention.
Figure 5B:
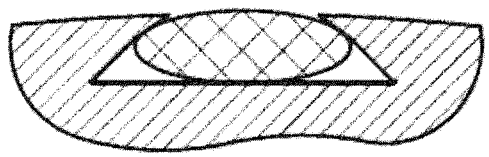
Figure 5C:
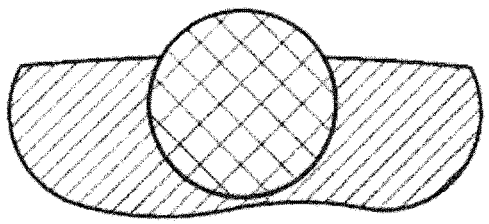
Figure 5D:
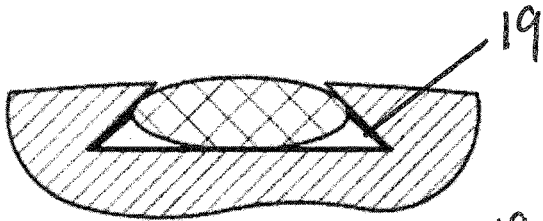
Figure 5E:
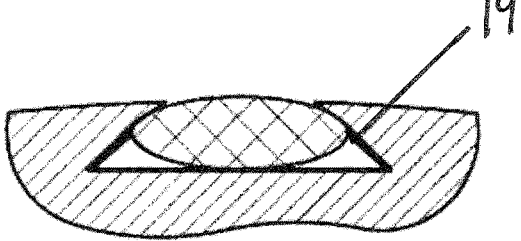

The process can be used in a similar way if a foil sleeve is not being used, as in the embodiments according to FIG. 4A to FIG. 4C, but instead foil bags or lines of foil bags that were obtained by welding together two foil films placed one on top of the other, whereby the transition areas 16 were formed as a result (see FIGS. 4D to 4F). The welded edge areas 19 of the mutually overlapping foil films are hereby configured in a broader manner, as can be particularly easily seen from the cross-sectional views of the FIGS. 4D to 4F. These edge areas 19 can contribute to an even more secure positioning of the adhesive containers inside the particularly undercut inlets or grooves, as also shown in the FIGS. 5D to 5E.

FIG. 6 shows a nipple 2 that is connected with an electrode 20, whereby in the groove 4 of the nipple thread, a foil bag 8 is positioned, which is filled with a pasty adhesive mixture. Due to the utilization of an undercut cross-sectional shape, the foil bag 8 that was placed or inserted into the groove 4 does not fall out of the groove 4 when handled in an appropriate manner. A box thread 22 of a further electrode 24 that is to be connected with the nipple thread is already indicated in FIG. 6. Furthermore, it is indicated by the dotted lines that the nipple 2 is configured as a double-conical nipple, and that one nipple thread of the double nipple is already present inside a carbon-containing electrode.

Figure 7:
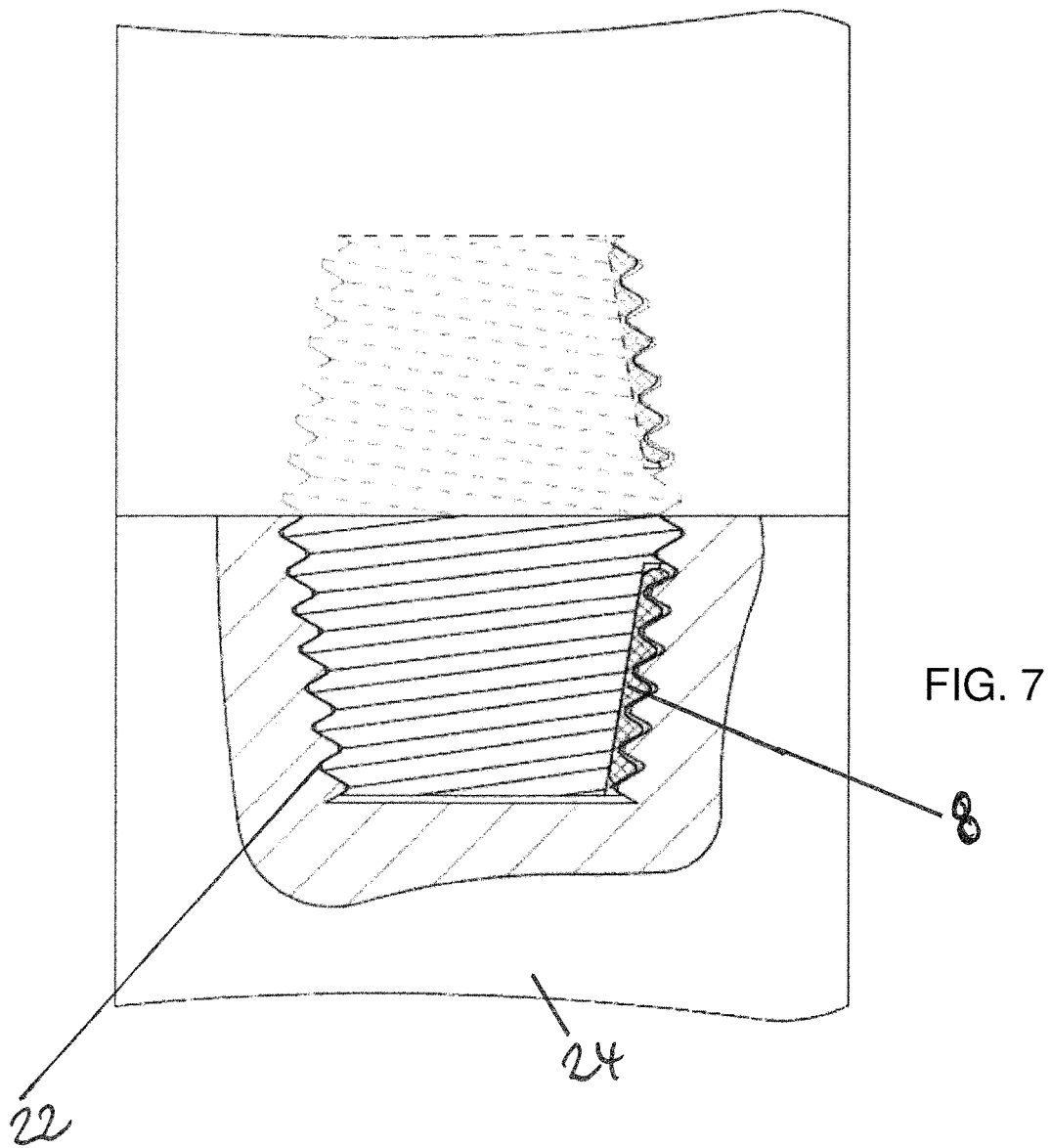
FIG. 7 is a diagrammatic, sectional view of an electrode/nipple connection according to the invention.
Figure 8:
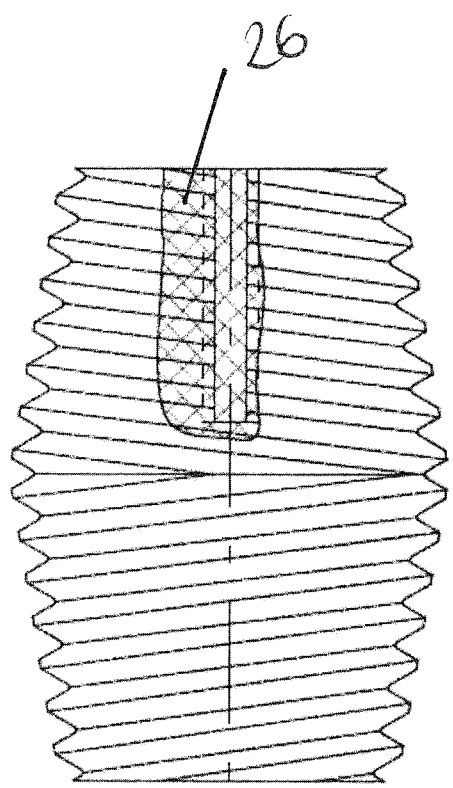
FIG. 8 is a diagrammatic, side view of a nipple according to the invention after it has been screwed into an electrode.

FIG. 7 depicts, in schematic sectional view, a box thread 22 of the further electrode 24 that is screwed together with the nipple 2, in accordance with FIG. 6. Already during the screwing process, when the nipple thread 2 and the box thread 22 interlock, the foil bag 8 is destroyed, so that the adhesive mixture contained inside the foil bag 8 is spread over a wide surface between the nipple thread 2 and the box thread 22, which is supported by the screwing movement. The large adhesive area 26 created in this way is schematically depicted in FIG. 8. As indicated by the dotted lines, the second conical nipple thread was also particularly firmly connected with a corresponding box thread of a separate electrode by utilizing a filled adhesive container that was present inside an undercut groove.

FIG. 9 shows a schematic side view of the nipple thread 34 and a box thread 28. In this case, the box thread 28 has an inlet 30 in the shape of a groove, in which a filled adhesive container 32 is positioned, which corresponds, as far as its cross-sectional shape is concerned, with the cross-sectional shape of the inlet 30, and that, in this particular case, does not only protrude over the flank bases of the thread but also over the flank ends. By screwing the nipple thread 34 into the box thread 28, the adhesive container is destroyed due to the turning movement, and the adhesive is spread over a large surface.

Figure 10:
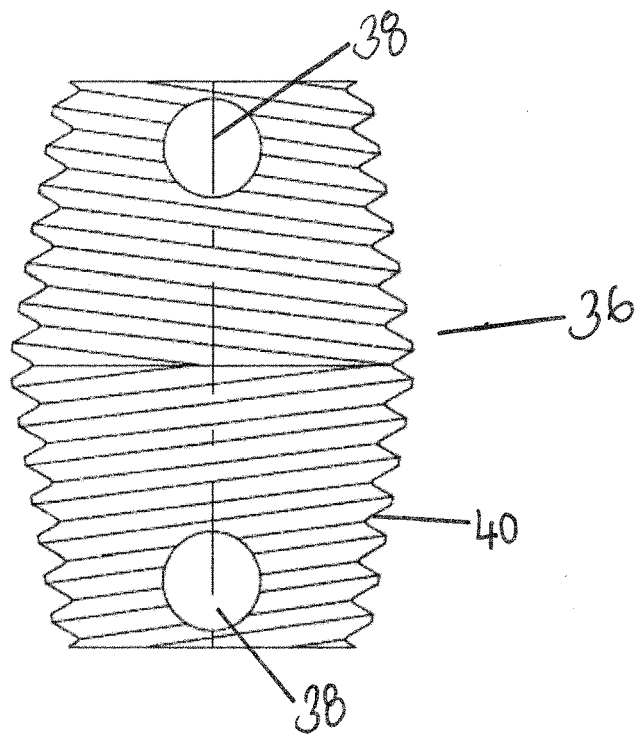
FIG. 10 is a diagrammatic, sectional view of a further arrangement of a nipple according to the invention.
Figure 11:
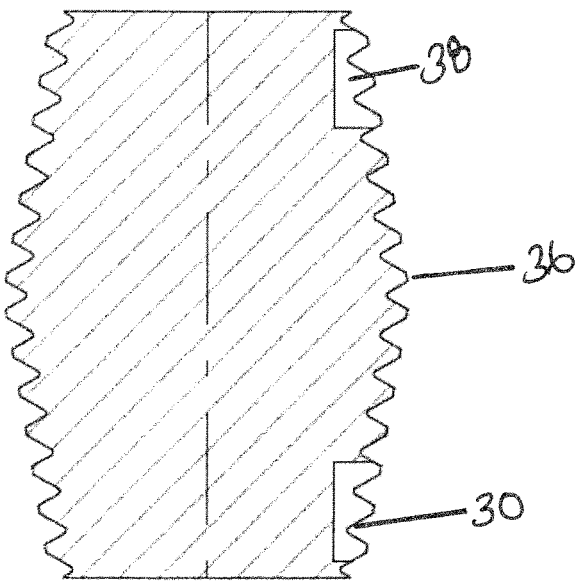
FIG. 11 is a diagrammatic, cross-sectional view of the nipple according to FIG. 10.
Figure 12:
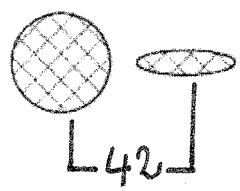
FIG. 12 is a schematic view of foil bags according to the invention.

FIG. 10 shows a schematic sectional view of a further arrangement of a nipple 36 according to the invention. The inlets 38 are present in the form of circular round holes in the respective nipple thread 40 and are arranged symmetrically. Of course, these inlets also can be arranged in the nipple threads of the double nipple in an asymmetric manner. The holes or inlets 38 in the depicted embodiment extend deeper than the profile depth of the thread, as shown in FIG. 11. Into these inlets 38, adhesive containers 42 can be inserted, as shown in FIG. 12, whereby these containers are aligned to the dimensions of the holes 38 as far as shape and size are concerned. These filled adhesive containers protrude again at least over the flank base of the nipple thread, which results in the release and widespread distribution of the adhesive due to the interaction between the nipple thread and a (not depicted) box thread of an electrode when they are screwed into each other. With this type of inlet, a particularly firm connection of a nipple/electrode system is also achieved.

The individual characteristics of the invention described in the description above, in the claims and in the drawings, as well as any combination thereof, can be essential for the realization of the invention in its different embodiments.

Embodiment Example

A thread box section was installed in a furnace and heated to a temperature of 320° C. The temperature was held over 24 h, in order to allow the entire thread box section to reach that temperature.

After that, the thread box section was taken out, and the nipple that was previously equipped with two bags according to the invention was inserted into the thread box section and screwed in.

After cooling, the connection was sawed through, in order to be able to see the different positions where the bag had burst. It could be established that the adhesive was evenly distributed during the screwing-in process.

The invention claimed is:

1. A method for producing an electrode/nipple system comprising the steps of:
   providing a nipple kit, containing:
     at least one carbon-containing nipple for carbon-containing electrodes, the carbon-containing nipple having at least one nipple thread with at least one inlet formed therein being a groove running across the nipple thread in a substantially perpendicular direction to the nipple thread, the carbon-containing nipple being a cylindrical double-thread nipple or a double-conical double-thread nipple; and
     at least one adhesive container disposed in the inlet, the adhesive container containing a liquid or pasty thermally and/or chemically curing adhesive for securing of an electrode/nipple connection,
     the adhesive container having at least one of at least one weakening area or at least one weakening line extending from one end of the adhesive container to an opposite end of the adhesive container and/or formed on a same side of the adhesive container;
   providing a carbon-containing electrode having a socket thread;
   screwing the at least one carbon-containing nipple into the socket thread of the carbon-containing electrode, the screwing step resulting in a destruction of the least one adhesive container thus releasing the liquid or pasty thermally and/or chemically curing adhesive;
   distributing a released adhesive during the screwing step over a surface that is larger than a surface covered by the inlet between the nipple thread and the socket thread; and
   hardening the released adhesive at a given temperature in a range between room temperature and up to 250° C. over a time period of at least five minutes.

2. The method according to claim 1, further comprising the steps of: providing a foil bag, where the adhesive container is disposed in the foil bag and configured as a lamination foil containing at least two laminated plastic foils or at least one plastic foil and at least one metal foil.

3. The method according to claim 2, wherein the weakening area of the provided lamination foil is a perforated area, and/or the at least one weakening line is a perforated line that extends substantially from one end of the foil bag to an opposite end and/or is present on a same side of the foil bag.

4. The method according to claim 2, wherein the foil bag is configured as at least two foil bags disposed in series and connected to each other, each of the foil bags contain at least one lamination foil formed from at least two laminated plastic foils or at least one plastic foil and at least one metal foil and an adhesive, namely a liquid or pasty, thermally or chemically curing adhesive for securing an electrode/nipple connection disposed in each lamination foil.

5. The method according to claim 1, wherein the foil bag is a single-chamber bag or a multi-chamber bag.

6. The method according to claim 1, wherein the adhesive is an adhesive mixture containing:
   at least one resin basis;
   at least one pitch basis; and
   at least one filler material containing graphite and/or soot particles with an average particle size of smaller or equal to 0.5 mm and at least one hardening agent.

7. The method according to claim 1, wherein the adhesive is an adhesive mixture kit, in which a hardening agent forms a separate component.

8. The method according to claim 1, wherein the inlet has two grooves, a first groove of the grooves is undercut and a second groove the grooves is not undercut.

9. The method according to claim 1, wherein the adhesive container disposed in the inlet is dimensioned in such a way that the adhesive container protrudes at least in sections over the nipple thread, whereby the weakening area and/or the weakening line is substantially positioned in that part of the adhesive container that is protruding over the nipple thread.

10. The method according to claim 9, wherein the adhesive container is one of a plurality of adhesive containers, and at least one of the weakening areas or the weakening lines are substantially positioned in the area of the adhesive container that is protruding over the nipple thread or said socket thread.

11. The method according to claim 1, wherein an electrode box of the carbon-containing electrode has a socket thread, the socket thread has at least one inlet formed therein suitable for receiving at least one adhesive container containing a liquid or pasty thermally and/or chemically curing adhesive for securing an electrode/nipple connection, whereby said inlet is a groove running across the socket thread, transversely to the socket thread.

12. The method according to claim 11, wherein the carbon containing electrode has a further thread, being a nipple thread or a further socket thread, positioned opposite to said electrode box with the socket thread, said further thread having at least one further inlet formed therein running across said further thread substantially perpendicular to said further thread.

* * * * *